United States Patent
Kung et al.

(10) Patent No.: US 9,009,591 B2
(45) Date of Patent: Apr. 14, 2015

(54) USER-SPECIFIED PHRASE INPUT LEARNING

(75) Inventors: Yun-Chiang Kung, Taipei (TW); Sheng-Yao Shih, Taipei (TW); Chin-Nan Lee, Taipei (TW); Yu-Li Huang, Taipei (TW); Hsiang-Fu Liu, Taipei (TW)

(73) Assignee: Microsoft Corporation, Redmond, WA (US)

( * ) Notice: Subject to any disclaimer, the term of this patent is extended or adjusted under 35 U.S.C. 154(b) by 1249 days.

(21) Appl. No.: 12/332,372

(22) Filed: Dec. 11, 2008

(65) Prior Publication Data

US 2010/0153091 A1 Jun. 17, 2010

(51) Int. Cl.
G06F 17/26 (2006.01)
G06F 17/24 (2006.01)
G06F 17/28 (2006.01)

(52) U.S. Cl.
CPC .................................. *G06F 17/2863* (2013.01)
USPC .......................................... 715/258; 715/257

(58) Field of Classification Search
USPC ...................... 704/9; 715/256–262
See application file for complete search history.

(56) References Cited

U.S. PATENT DOCUMENTS

| | | | |
|---|---|---|---|
| 6,073,146 A * | 6/2000 | Chen ............................. | 715/264 |
| 6,173,252 B1 * | 1/2001 | Qiu et al. .......................... | 704/9 |
| 2003/0212541 A1 | 11/2003 | Kinder | |
| 2004/0117740 A1 * | 6/2004 | Chen et al. .................... | 715/531 |
| 2005/0102249 A1 | 5/2005 | Bigus | |
| 2005/0283726 A1 * | 12/2005 | Lunati ........................... | 715/533 |
| 2006/0018545 A1 * | 1/2006 | Zhang et al. ................... | 382/185 |
| 2006/0129926 A1 | 6/2006 | Malek et al. | |
| 2006/0173674 A1 * | 8/2006 | Nakajima et al. ................. | 704/9 |
| 2006/0290535 A1 | 12/2006 | Thiesson et al. | |
| 2007/0052868 A1 | 3/2007 | Chou et al. | |
| 2007/0079239 A1 | 4/2007 | Ghassabian | |

(Continued)

FOREIGN PATENT DOCUMENTS

| | | |
|---|---|---|
| CN | 1704879 A | 12/2005 |
| JP | 63-065564 A | 3/1988 |

(Continued)

OTHER PUBLICATIONS

Lee et al., "Text Segmentation for Chinese Spell Checking", Journal of the American Society for Information Science, 1999.*

(Continued)

*Primary Examiner* — Samuel G Neway (74) *Attorney, Agent, or Firm* — Steve Crocker; Peter Taylor; Micky Minhas (57) ABSTRACT

Architecture that enables a user to perform manual word-breaking by phrase input. Phrase input is where the user inserts a phrase-key (or separator) as a delimiter that indicates to an editor application such as an IME (input method editor) the composition of a specific phrase when entering characters (e.g., Asian). The word-breaking is controlled by the user. The conversion quality is improved as the user knows the desired input and ambiguous cases are reduced. A phrase can be specified while the user is composing the characters. By selecting a phrase-key separator, the user can specify the composing characters before the characters are presented as a phrase. Moreover, the architecture includes a phrase prioritization mechanism wherein each phrase can be treated as a single entity and assigned a character identifier (ID), which is related to the sequence of a candidate list.

20 Claims, 11 Drawing Sheets

(56) References Cited

U.S. PATENT DOCUMENTS

| | | |
|---|---|---|
| 2007/0242071 A1 | 10/2007 | Harding |
| 2008/0195388 A1 | 8/2008 | Bower et al. |
| 2010/0180199 A1* | 7/2010 | Wu et al. .................. 715/259 |

FOREIGN PATENT DOCUMENTS

| | | |
|---|---|---|
| JP | 01-217552 A | 8/1989 |
| JP | 04-211862 A | 8/1992 |
| JP | 08-044472 A | 2/1996 |
| JP | 08-263471 A | 10/1996 |
| JP | 09-006761 A | 1/1997 |
| JP | 10-254873 A | 9/1998 |
| JP | 11-250049 A | 9/1999 |
| TW | 200816007 A | 4/2008 |
| TW | 200820635 A | 5/2008 |
| WO | 2008144964 A1 | 12/2008 |

OTHER PUBLICATIONS

"International Search Report", Mailed Date: Aug. 2, 2010, Application No. PCT/IB2009/007688, Filed Date: Nov. 6, 2009, pp. 9.

Hsu, et al., "Spoken Correction for Chinese Text Entry", Retrieved at <<http://people.csail.mit.edu/bohsu/SpokenCorrectionForChineseTextEntry2006.pdf>>, pp. 12.

"Natural Chinese Input 8", Retrieved at <<http://www.iq-t.com/en/Products/going_01.asp>>, Sep. 25, 2008, pp. 7.

Barzilay, et al., "Learning to Paraphrase: An Unsupervised Approach using Multiple-Sequence Alignment", Retrieved at <<http://acl.ldc.upenn.edu/N/N03/N03-1003.pdf>>, Proceedings of HLT-NAACL 2003, Main Papers, Edmonton, May-Jun. 2003, pp. 16-23.

First Office Action for Chinese Patent Application No. 200980150342.9, which was filed Nov. 6, 2009, OA mailed Aug. 1, 2012, 9 pages.

Second Office Action for Chinese Patent Application No. 200980150342.9, which was filed Nov. 6, 2009, OA mailed Feb. 4, 2013, 9 pages.

Office Action for Chinese Patent Application No. 200980150342.9, which was filed Nov. 6, 2009, OA mailed Feb. 11, 2014, 8 pages.

Office Action for Japan Patent Application No. 2011-540230, which was filed Nov. 6, 2009, OA mailed May 9, 2014, 4 pages.

Notice of Reexamination for Chinese Patent Application No. 200980150342.9, which was filed Nov. 6, 2009, Notice mailed Sep. 22, 2014, 12 pages.

Office Action for Japan Patent Application No. 2011-540230, which was filed Nov. 6, 2009, OA mailed Jul. 17, 2013, 7 pages.

Office Action for Chinese Patent Application No. 200980150342.9, which was filed Nov. 6, 2009, OA mailed Aug. 2, 2013, 9 pages.

"Search Report and Office Action Issued in Taiwan Patent Application No. 098138156", Mailed Date: Feb. 11, 2015, 13 Pages.

* cited by examiner

USER-SPECIFIED PHRASE INPUT LEARNING

BACKGROUND

The evolution of global communications facilitated by advances in technology continues to benefit users in business and personal life. However, new problems that did not previously exist emerge and require solutions. For example, communications in the form of language translation in text-based communications emerge as a problem that needs a solution to facilitate more efficient and effect communications. Languages that employ thousands of characters, such as variations of the Chinese language, are more complex and therefore, direct translation is not straight forward. Thus, the accuracy in conversion is reduced.

When using automated means for inputting and converting East Asian characters, the conversion accuracy depends significantly on the quality of word-breaking capability of an editor application such as an IME (input method editor). While the word-breaking quality of the application may not be perfect, the rapidly evolving language development of new words and new usages, for example, makes it increasingly difficult or impossible for the application vendor to keep up.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a mechanism that enables a user to do the word-breaking manually by phrase input. Phrase input means that the user can use a phrase-key (or separator) as a delimiter that indicates to the editor application the composition of a specific phrase when entering characters (e.g., Asian). That is, the word-breaking is controlled by the user. The conversion quality is improved as the user knows the desired input and ambiguous cases are reduced. Therefore, conversion accuracy is improved with enhanced word-breaking.

A phrase can be specified easily while the user is composing the characters. For example, by selecting a phrase-key separator, the user can specify the composing characters before the characters are presented as a phrase. Moreover, the architecture includes a phrase prioritization mechanism wherein each phrase can be treated as a single entity and assigned a character identifier (ID), which is related to the sequence of a candidate list.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture enables a user to perform manual word-breaking by phrase input. Phrase input is where the user inserts a phrase-key (or separator) as a delimiter that indicates to an editor application such as an IME (input method editor) the composition of a specific phrase when entering characters (e.g., Asian). The word-breaking is controlled by the user. The conversion quality is improved as the user knows the desired input and ambiguous cases are reduced. A phrase can be specified while the user is composing the characters. By selecting a phrase-key separator, the user can specify the composing characters before the characters are presented as a phrase. Moreover, the architecture includes a phrase prioritization mechanism wherein each phrase can be treated as a single entity and assigned a character identifier (ID), which is related to the sequence of a candidate list.

For instance, to prevent the editor application from converting 電子郵件 to 電子游件 (where 子游 is the name of an ancient scholar in Chinese history), a user can enter a phrase-key separator in the character string to obtain 電子<phrase-key>郵 In that way, 電子 is interpreted as a word, and 郵件, a word, as well. Accordingly, based on the structure of the phrases input by the user, the editor application can achieve greater conversion accuracy.

Reference is now made to the drawings, wherein like reference numerals are used to refer to like elements, throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Languages typically include formats where characters are spaced or not spaced. For example, the English language employs spacing to separate strings of characters into recognizable words. Other languages do not always use such spacing, such as in Asian languages. The phrase input architecture assist users in improving input accuracy by allowing the users to choose candidate characters by opening a candidate character window and determining where to insert separators. It is to be appreciated, however, that the disclosed architecture can also be employed where the language currently employs spacing.

Figure 1:
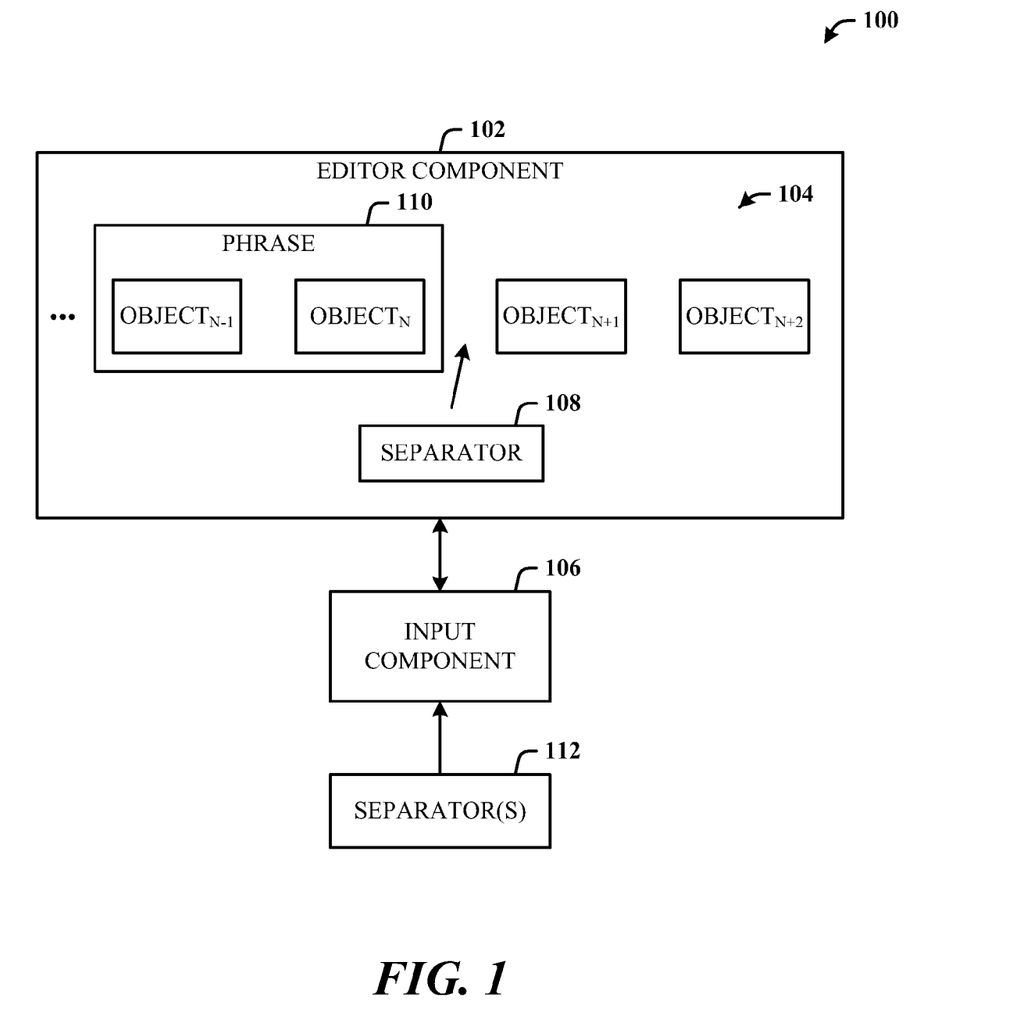
FIG. 1 illustrates a computer-implemented language editing system in accordance with the disclosed architecture.

FIG. 1 illustrates a computer-implemented language editing system 100 in accordance with the disclosed architecture. The system 100 includes an editor component 102 for receiving and processing a string of language objects 104 of a written language. The written language can be an East Asian language. The system 100 can also include an input component 106 for inserting a user-specified separator 108 into the string of the language objects 104 to break language objects of the string of objects 104 into a phrase 110 recognizable as a grammatical unit. The separator is manually inserted as the language objects are entered.

The editor component 102 can apply emphasis (e.g., highlighting, underlining, bolding, etc.) to the phrase 10 to designate the phrase as disambiguated. Additionally, the editor component 102 applies an associated emphasis to a deconstructed phrase to designate the deconstructed phrase as ambiguated. The user can then quickly see the emphasis to determine the editor's designation of the phrase and/or objects.

Figure 2:
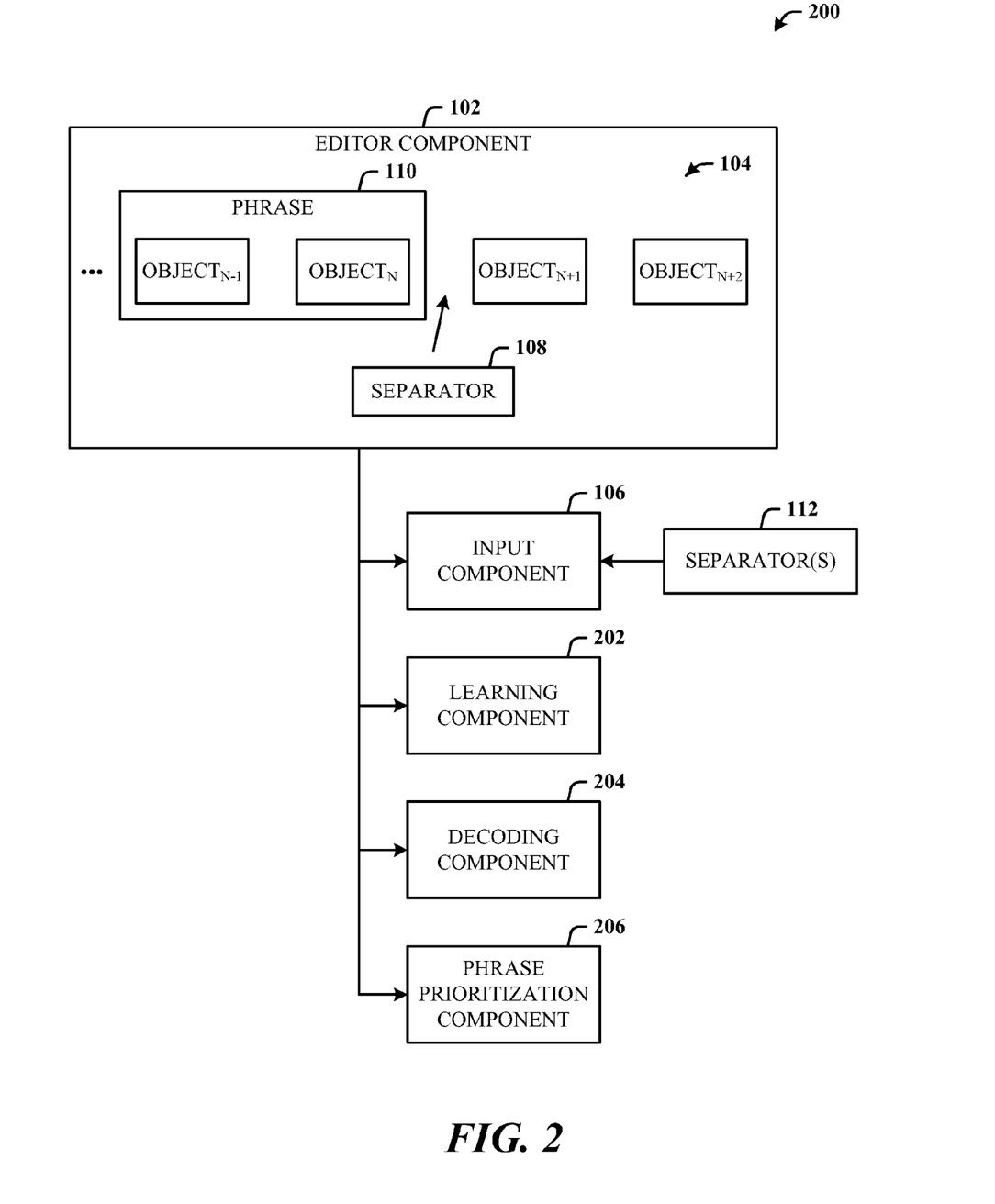
FIG. 2 illustrates an alternative embodiment of a language editing system.

FIG. 2 illustrates an alternative embodiment of a language editing system 200. The system 200 comprises the editor component for receiving and processing the string of language objects of a written language (e.g. Traditional Chinese, Simplified Chinese, etc.) and the input component 106 for manually (e.g., keyboard, voice input and control, touch pad selection, etc.) inserting the user-specified separator 108 into the string of the language objects 104 to break language objects of the string into the phrase 110 recognizable as a grammatical unit.

The system 200 can further comprise a learning component 202 for leaning the phrase 110 based on multiple uses of the separator 108 to create the phrase 110. The system 200 can further comprise a decoding component 204 for selecting an optimum path in a language model based on the phrase 110. The system 200 can further comprise a phrase prioritization component for ranking the phrase 110 among other candidate phrases and automatically suggesting a ranked phrase for insertion into the string. As before, the editor component 102 can apply the emphasis to the phrase to designate the phrase as disambiguated, and to a deconstructed phrase to designate the deconstructed phrase as ambiguous.

Figure 3:
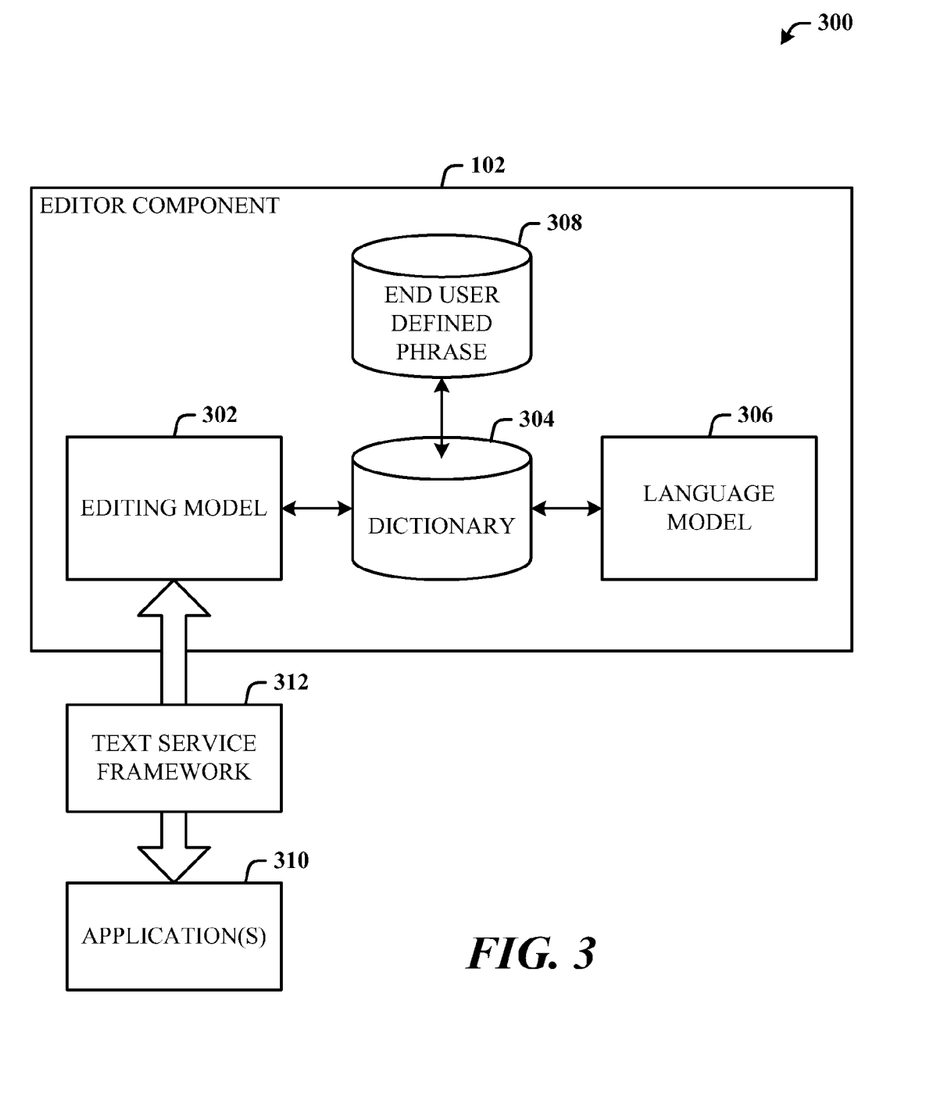
FIG. 3 illustrates an alternative embodiment of a language editing system showing a more detailed representation of the editor component.

FIG. 3 illustrates an alternative embodiment of a language editing system 300 showing a more detailed representation of the editor component 102. The editor component 102 can include an editing model 302 that defines the workings of the editor component 102. The editing model 302 interfaces to a dictionary 304 of phrases defined by language objects. A language model 306 interfaces to the dictionary 304 to provide the particular language objects that can be input and separated into the proper grammatical units or phrases. The language model 306 serves as the basis for a large segment of language objects (e.g. words, phrases, characters, etc.) employed in the particular language being edited. For example, one language model can be Traditional Chinese, and another language model can be Simplified Chinese. It is also to be understood that where such languages are close in written language objects, the language model 306 can include both Simplified and Traditional Chinese language objects and phrases.

For example, when a user is inputting language objects, some objects can be interpreted as intended phrases (disambiguated), unintended phrases (ambiguous) that the editing model 302 will attempt to interpret using the dictionary 304. If the phrases are in the dictionary, these can be emphasized as understood phrases. However, if the phrase is not in the dictionary 304, the editor component 102 automatically designates (emphasizes) the phrase as ambiguous. The user can correct this ambiguity by manually entering a separator that disambiguates the phrase into a user-defined phrase according to the user desire. Once "corrected" or defined, the user-defined phrase can be stored in the dictionary for future interpretation by the editor component 102.

The system 300 illustrates one or more applications 310 that interface to the editor component 102 through a text service framework 312. For example, one of the applications 310 can be a word processing application and/or a communications application such as email.

Figure 4:
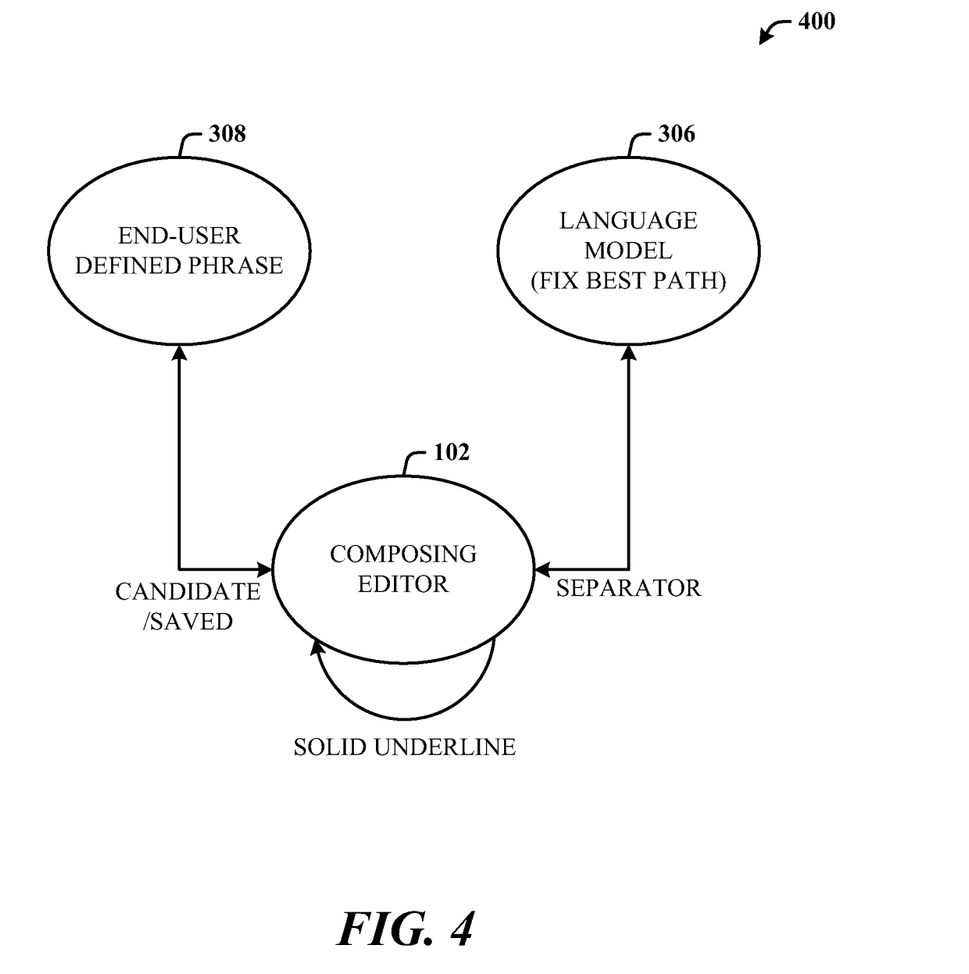
FIG. 4 illustrates a flow diagram for phrase processing.

FIG. 4 illustrates a flow diagram 400 for phrase processing. The user interacts with the composing editor (the editor component 102) to input language objects. The composing editor 102 provides emphasis (e.g., solid underline) to the language objects as the user enters the objects. To word-break at the appropriate place in the string of language objects, the user can enter the separator, which is then processed by the language model 306 to find the optimum path.

When entered, the phrase-key (or separator) is automatically recognized by the system as a specific word-breaking character employed by the user for separating the string into the proper phrase(s). This phrase key can also be utilized later in the same application for other purposes.

If the same phrase is specified by the user more than once, the phrase is recognized as learned. That is, the phrase is recorded and can be used across the application session, unless the phrase has been removed.

An input editor language model runtime (LMR) can be used for Language Model decoding. The core functionalities of the LMR can be summarized in two domains: lattice decoding-searching the optimal hypothesis (or paths) from a large number of input alternatives or candidates, and context editing-tracking the context, which contains many alternatives using a lattice, and support insertion/deletion/replacing or error correction on the lattice.

For the first functionality of lattice decoding, the phrase input can fix the optimum path in LMR. That is, the user can expect that the phrase input will not change again even as the user continues typing without finalizing the composing characters.

Conversion accuracy depends significantly on the quality of the word-breaking. Where the automated word-breaking is imperfect, the word-breaking is left to the user. A user can use a stipulated <phrase key> as a delimiter to indicate to the editor component what language objects compose a phrase when the user is typing with the editor component. Based on the structure of the phrases provided by the user, the editor component performs the conversion and result in improved conversion accuracy.

In one implementation, where the separator <phrase-key> is assigned as the "\" key (also recognized as 0x005C, backslash or reverse solidus), and inserted in an ambiguous (or undetermined) string of the language objects, a new phrase may be created and emphasis in the form of a solid underline can be applied to the new phrase.

A "phrase" is intended to mean the characters before an inserted separator of an undetermined string of language objects if the separator is the first inserted separator, or the characters between two consecutive separators of an undetermined string. However, if there is no language object (e.g., character) between two consecutive separators, the editor component can be configured to do nothing. The phrase can be the highlighted language objects (e.g., characters) of part or all of the ambiguous (undetermined) string of objects when the <phrase key> (e.g., the backslash character key) is pressed.

Following are restrictions that can be employed for phrases. For example, one restriction (or exception) is a length limit imposed on a phrase (longer than x number of language objects). If the user presses the <phrase key> for an ambiguous string longer than x objects (e.g., characters), only the last x characters are considered as a phrase.

Another restriction relates to an object without reading. If the ambiguous string that is about to be constructed as a phrase contains any objects that do not have an associated reading (e.g. punctuations), the phrase construction will fail silently (that is, there is no UI change or response to the <phrase key> input).

For example, when a user presses the separator <phrase key> at the end of following undetermined string, the editor will not respond. However, an alert or beep can be provided, as desired. In another implementation, characters between a comma and the <phrase key> are considered a phrase, as indicated below.

電子．郵佳 <phrase key>→郵件

If the user never uses the separator associated with the <phrase key> for phrase input, the underline emphasis under the ambiguous string is dotted, which maintains UI backward compatibility. However, when a phrase is constructed, the underline under the language objects (e.g., characters) is changed to a solid underline to provide feedback to the user of the formation of a phrase. Thus, for example, typing of 電子<phrase key>郵件<phrase key> results in 電子 郵件.

When drawing the solid underline, the length of the underline is shortened to visually present distinctiveness of the grouped language objects. In other words, two continuous solid underlines do not appear as a single long underline, as illustrated below. 電子 郵件

In some applications such as text applications and presentation applications, it may not be possible to see the space between two consecutive solid underlines. In other words, two consecutive phrases will appear as a single long phrase with a single continuous underline. In order to mitigate the possible confusion of such a UI, when the user moves the cursor over the objects in an undetermined string, to a phrase, the UI shows a bold solid underline for the phrase, which more quickly focuses user attention to the phrase, as shown below. 電子郵件

With respect to phrase destruction, if the user modifies (e.g., add, remove, change, etc.) object (e.g., characters) to a phrase in an undetermined string, the phrase can be destructed, and the solid underline changes to regular dotted underline. For instance, if the user constructs a phrase of two characters and then deletes the second character, or adds an extra character inbetween these two characters, the phrase is destructed.

Beyond an improved word-breaking mechanism where the user specifies the phrase by way of the separator <phrase key>, another benefit of using the phrase input is to accelerate learning. Since the phrase input implies that a user expects to define phrases explicitly, a phrase can be added to user-defined phrases in the end-user defined phrase 308 when the user types the same phrase s times (e.g., two) by using <phrase key>. This design ensures that the user obtains a faster learning effect in a phrase input.

Figure 5:
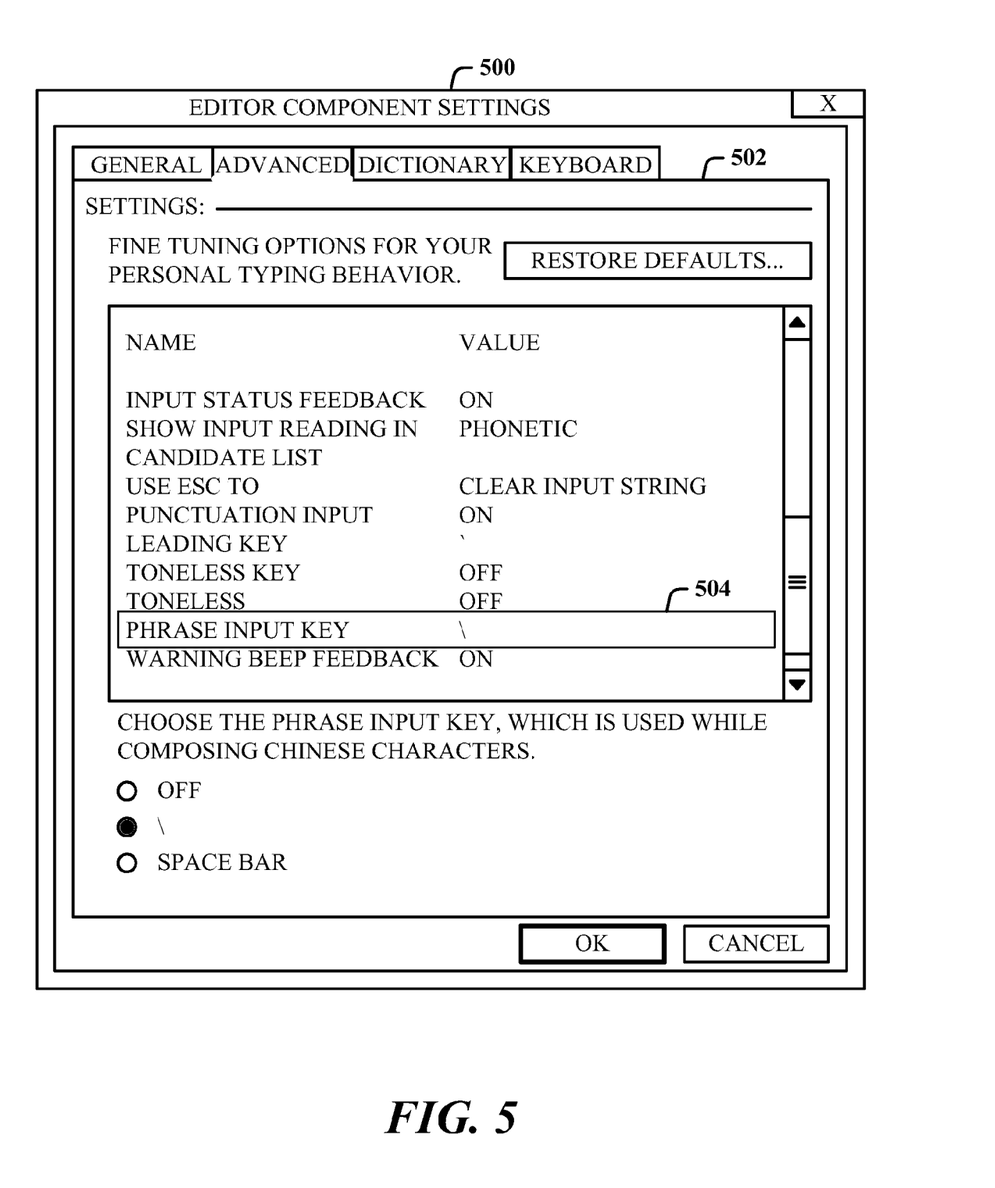
FIG. 5 illustrates an exemplary UI in English that facilitates settings configuration for the phrase input for Chinese language objects.

FIG. 5 illustrates an exemplary UI 500 in English that facilitates settings configuration for the phrase input for Chinese language objects. The UI 500 includes an Advanced panel 502 where the phrase input options can be set and the phrase input key defined (here, as the backslash key), as emphasized by the box 504 (or other form of emphasis such as highlighting).

Figure 6:
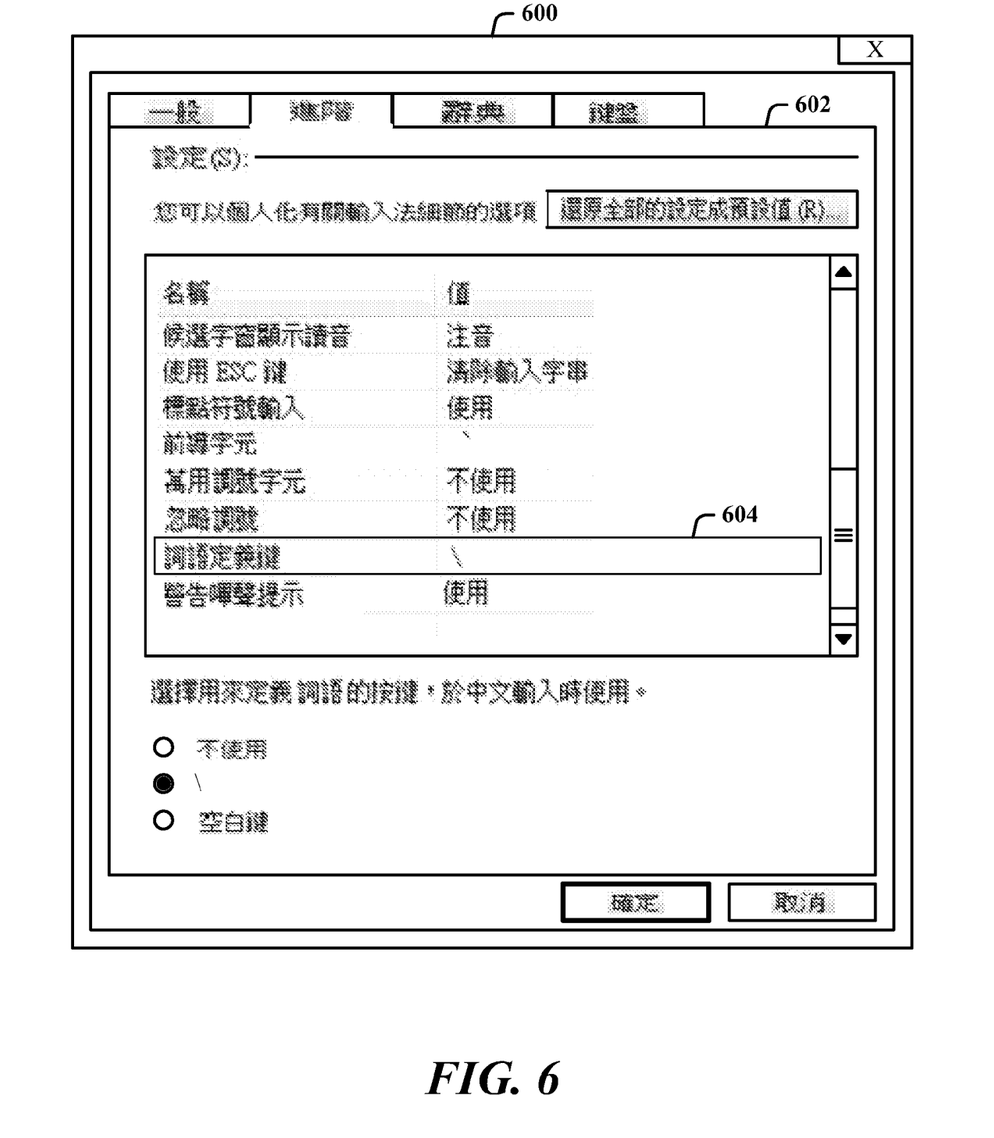
FIG. 6 illustrates the exemplary UI of FIG. 5 in a Chinese language UI that facilitates settings configuration for the phrase input.

FIG. 6 illustrates the exemplary UI 500 of FIG. 5 in a Chinese language UI 600 that facilitates settings configuration for the phrase input. The UI 600 includes an Advanced panel 602 where the phrase input options can be set and the phrase input key defined (here, as the backslash key), as emphasized by box 604 (or other form of emphasis such as highlighting).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
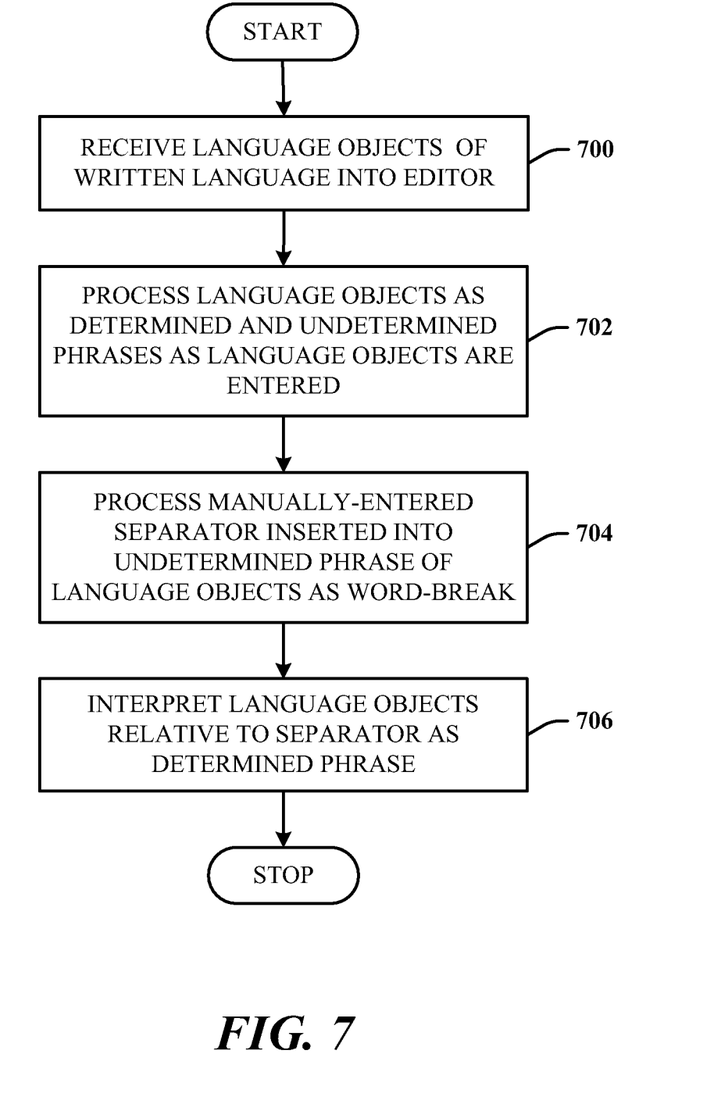
FIG. 7 illustrates a method of language editing.

FIG. 7 illustrates a method of language editing. At 700, language objects of a written language are received into an editor. At 702, the language objects are processed as determined and undetermined phrases as the language objects are entered. At 704, a manually-entered separator inserted into an undetermined phrase of the language objects is processes as a word-break. At 706, language objects relative to the separator are interpreted as a determined phrase.

As before, the language objects can be part of an East Asian language, for example. Other languages can benefit from the disclosed architecture as well. The method can further comprise automatically toggling between mode typing and modeless typing based on selection of a keyboard key assigned to the separator. For example, if the user presses the <phrase-key> assigned to the separator, the editor automatically understands that subsequent input is to editing mode.

Figure 8:
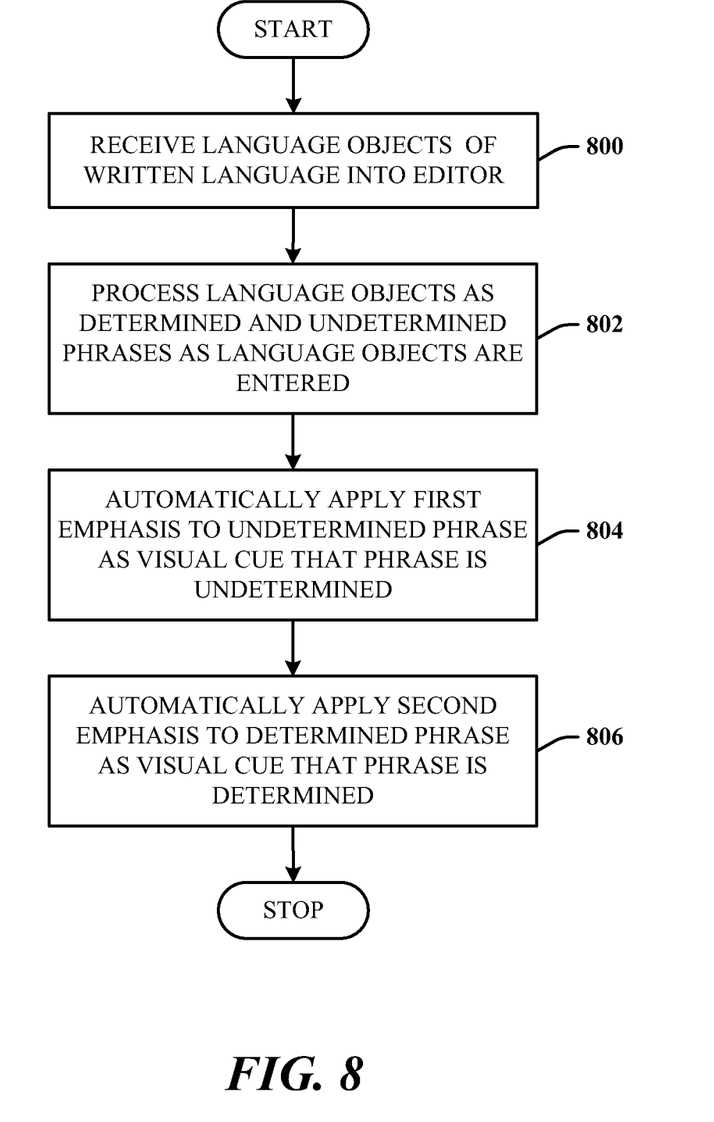
FIG. 8 illustrates a method of providing visual cues to determined and undetermined phrases.

FIG. 8 illustrates a method of providing visual cues to determined and undetermined phrases. At 800, language objects of a written language are received into an editor. At 802, the language objects are processed as determined and undetermined phrases as the language objects are entered. At 804, a first emphasis (e.g., bolding, dotted underline, solid underline, highlighting, etc.) is applied to an undetermined phrase as a visual cue that the phrase is undetermined. At 806, a second emphasis (e.g., bolding, dotted underline, solid underline, highlighting, etc.) is applied to a determined phrase as a visual cue that the phrase is determined.

The first emphasis and second emphasis can be the same emphasis types (e.g., bold, underline, etc.); however, different from each other as designated by the user or the editor defaults, for example. Note that as the undetermined phrase changes to a determined phrase (when using the separator), and vice versa, the emphasis dynamically changes to match the undetermined or determined state. Thus, the user can see instantly how the phrase of language objects is interpreted by the editor, and enter the separator to quickly clarify the phrase.

Figure 9:
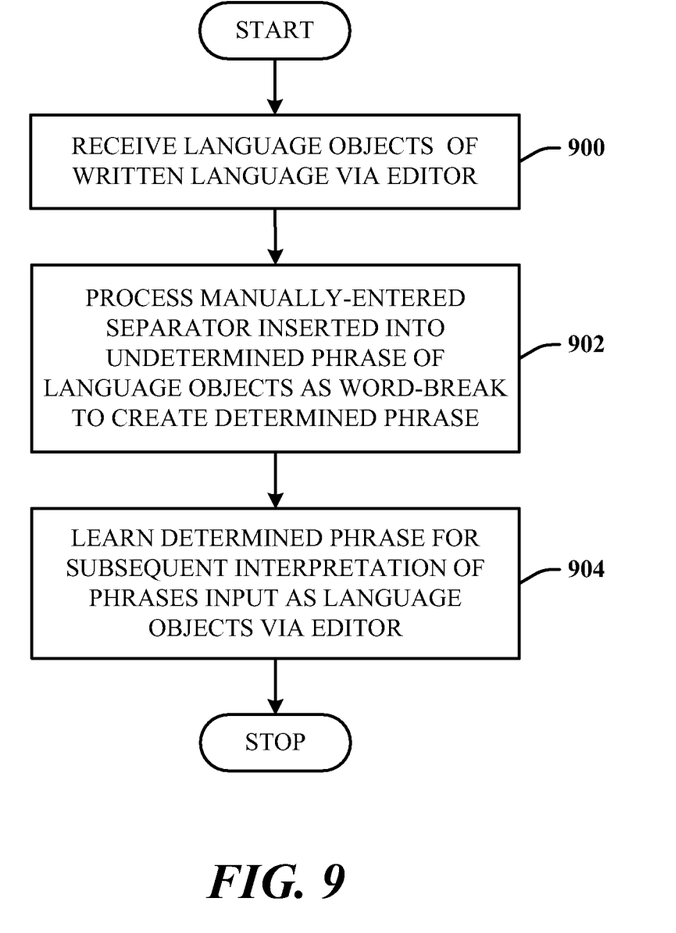
FIG. 9 illustrates a method of learning phrases.

FIG. 9 illustrates a method of learning phrases. At 900, language objects of a written language are received into an editor. At 902, a separator manually-inserted into an undetermined phrase as the language objects is processed as a word break to create a determined phrase. At 904, the determined phrase is learned for subsequent interpretation of phrases input as language objects via the editor.

Figure 10:
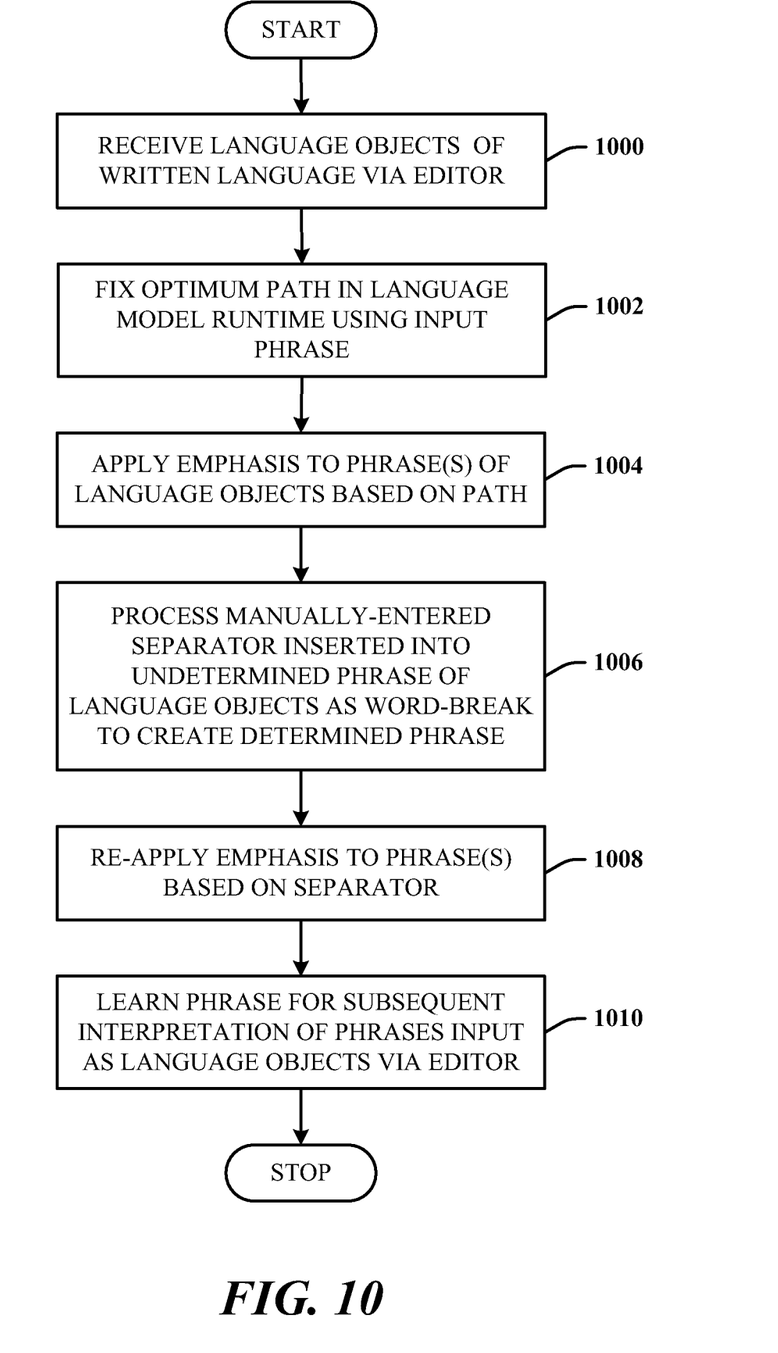
FIG. 10 illustrates a method of determining an optimum path in a runtime using an input phrase.

FIG. 10 illustrates a method of determining an optimum path in a runtime using an input phrase. At 1000, language objects of a written language are received into an editor. At 1002, an optimum path in a language model runtime is fixed using the input phrase. At 1004, emphasis is applied to phrase(s) of language objects based on the path. At 1006, a manually-entered separator inserted into an undetermined phrase of language objects is processed as a word-break to create a determined phrase. At 1008, emphasis is re-applied to the phrase(s) based on the separator. At 1010, the determined phrase is learned for subsequent interpretation of phrases input as language objects via the editor.

While certain ways of displaying information to users are shown and described with respect to certain figures as screenshots, those skilled in the relevant art will recognize that various other alternatives can be employed. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both all application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
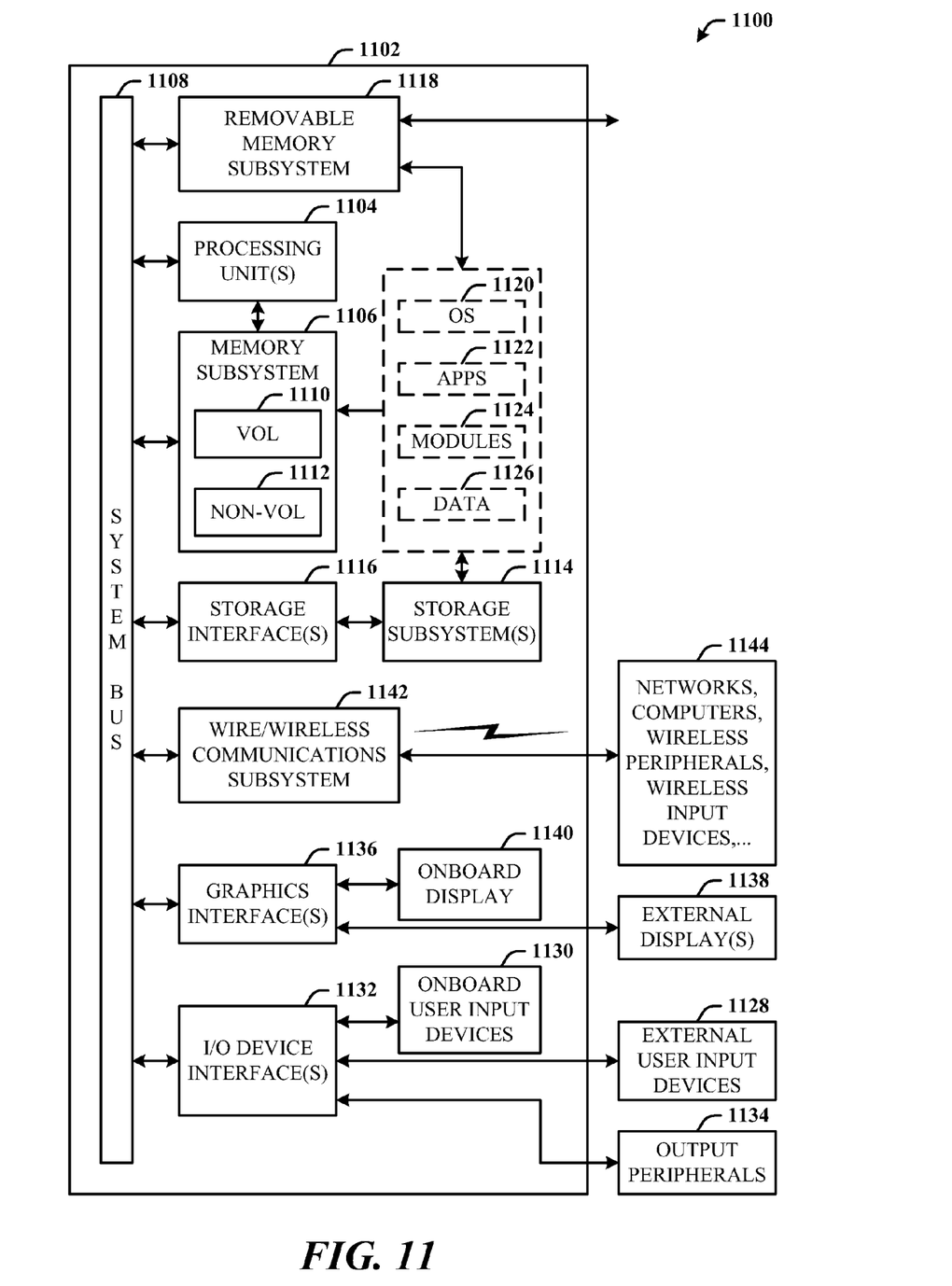
FIG. 11 illustrates a block diagram of a computing system operable to execute language phrase editing and learning in accordance with the disclosed architecture.

Referring now to FIG. 11, there is illustrated a block diagram of a computing system 1100 operable to execute language phrase editing and learning in accordance with the disclosed architecture. In order to provide additional context for various aspects thereof, FIG. 11 and the following discussion are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g. desktop, laptop, etc.), hand-held computing devices, microprocessor-based or programmable consumer electronics, and the like, each of which can be operatively coupled to one or more associated devices.

The system memory 1106 can include volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the nonvolatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the memory subsystem 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes storage subsystem(s) 1114 and storage interface(s) 1116 for interfacing the storage subsystem(s) 1114 to the system bus 1108 and other desired computer components. The storage subsystem(s) 1114 can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a removable memory subsystem 1118 (e.g., flash drive form factor technology), and/or the storage subsystem(s) 1114, including an operating system 1120, one or more application programs 1122, other program modules 1124, and program data 1126. The one or more application programs 1122, other program modules 1124, and program data 1126 can include the entities of the system 100 of FIG. 1, the entities of the system 200 of FIG. 2, the language editing system 300 of FIG. 3, the flow diagram 400 of FIG. 4, the UI 400 of FIG. 5, the UI 600 of FIG. 6, and the methods of FIGS. 7-10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory, such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Computer readable media can be any available media that can be accessed by the computer 1102 and includes volatile and non-volatile media, removable and non-removable media. For the computer 1102, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP) using logical connections via a wire/wireless communications subsystem 1142 to one or more networks and/or other computers. The other computers can include workstations, servers, routers, personal computers, microprocessor-based entertainment appliance, a peer device or other common network node, and typically include many or all of the elements described relative to the computer 1102. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wire/wireless communication subsystem 1142 (e.g., a network interface adapter, onboard transceiver subsystem, etc.) to communicate with wire/wireless networks, wire/wireless printers, wire/wireless input devices 1144, and so on. The computer 1102 can include a modem or has other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wire/ wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented language editing system, comprising:
an editor component configured to receive and process a string of language objects of a written language and for visually designating the string as ambiguous if the string is not in a dictionary;
an input component configured to enable insertion of a user-specified phrase-key separator into the string of the language objects to disambiguate language objects of the string into a user-defined phrase recognizable as a grammatical unit, as the language objects are being input, wherein the phrase-key separator is a user-specified character automatically recognized by the system as a specific word-breaking character for activating an editing mode for separating the string into a proper phrase, wherein the editing mode changes the user-defined phrase by applying visually distinctive emphasis to the user-defined phrase;
a user interface configured to facilitate settings configuration for phrase input, including phrase input options that define a user-selected keyboard key to be assigned as the phrase-key separator; and
a microprocessor that executes computer-executable instructions in a memory associated with the editor component, the input component, and the user interface.

2. The system of claim 1, wherein the written language is an East Asian language.

3. The system of claim 1, further comprising a decoding component configured to select an optimum path in a language model based on the phrase.

4. The system of claim 1, wherein the phrase-key separator is manually inserted as the language objects are entered.

5. The system of claim 1, wherein the editor component applies highlighting emphasis to the phrase to designate the phrase as disambiguated.

6. The system of claim 1, wherein the editor component applies an associated underlining emphasis to a deconstructed phrase to designate the deconstructed phrase as ambiguated.

7. The system of claim 1, further comprising a learning component configured to learn the phrase based on multiple uses of the separator to create the phrase.

8. The system of claim 1, further comprising a phrase prioritization component configured to rank the phrase among other candidate phrases and automatically suggest a ranked phrase for insertion into the string.

9. A computer-implemented language editing system, comprising:

an editor component configured to receive and process a string of language objects of a written language and for providing visual emphasis to an unrecognizable string;

an input component configured to enable manual insertion of a user-specified phrase-key separator into the unrecognizable string of the language objects to break language objects of the string into a phrase recognizable as a grammatical unit, as the language objects are being input, wherein the phrase-key separator is a user-specified character automatically recognized by the system as a specific word-breaking character for separating the string into a proper phrase and applies a different visual emphasis to the recognizable phrase;

a learning component configured to learn the phrase based on multiple uses of the separator to create the phrase;

a user interface configured to facilitate settings configuration for phrase input, including phrase input options for defining a user-selected keyboard key to be assigned as the phrase-key separator; and a microprocessor that executes computer-executable instructions in a memory associated with at least one of the editor component, the input component, or the learning component.

10. The system of claim 9, further comprising a decoding component configured to select an optimum path in a language model based on the phrase.

11. The system of claim 9, further comprising a phrase prioritization component configured to rank the phrase among other candidate phrases and automatically suggest a ranked phrase for insertion into the string.

12. The system of claim 9, wherein the written language is an East Asian language.

13. The system of claim 9, wherein the editor component applies a first type of emphasis to the phrase to designate the phrase as disambiguated, and a second type of emphasis to a deconstructed phrase to designate the deconstructed phrase as ambiguous.

14. A computer-implemented language editing method, comprising acts of:

employing a user interface for configuring settings for phrase input options, to define a user-selected keyboard key to be assigned as a phrase-key separator;

receiving language objects of a written language into an editor;

processing the language objects as determined and undetermined phrases as the language objects are entered;

processing the phrase-key separator, manually-entered into an undetermined phrase of the language objects, as a word-break as the language objects are entered to designate language objects before the phrase-key separator as a phrase, wherein the phrase-key separator is a specific user-specified character automatically recognized by the system as a specific word-breaking character for separating the string into a proper phrase;

interpreting language objects relative to the phrase-key separator as a determined phrase, applying visual distinctiveness to the determined phrase based on the phrase-key separator; and utilizing a microprocessor that executes instructions stored in a memory associated with at least one of the acts of receiving, processing the language objects, processing the manually-entered separator, interpreting, or applying.

15. The method of claim 14, wherein the language objects are part of an East Asian language.

16. The method of claim 14, further comprising:

automatically applying a first emphasis to the undetermined phrase as a visual cue that the phrase is undetermined; and automatically applying a second emphasis to the determined phrase as a visual cue that the phrase is determined.

17. The method of claim 14, further comprising specifying language objects before the phrase-key separator as the determined phrase.

18. The method of claim 14, further comprising learning the determined phrase for subsequent interpretation of phrases input as language objects in the editor.

19. The method of claim 14, further comprising automatically toggling between mode typing and modeless typing based on selection of a keyboard key assigned to the phrase-key separator.

20. The method of claim 14, further comprising fixing an optimum path in a language model runtime using lattice decoding of a phrase input via the editor.

* * * * *